US012451698B2

(12) United States Patent
Vestesen et al.

(10) Patent No.: US 12,451,698 B2
(45) Date of Patent: Oct. 21, 2025

(54) METHOD AND SYSTEM FOR OPERATING AN ELECTRICAL GRID

(71) Applicant: Vestesen Hybrid Energy ApS, Hellerup (DK)

(72) Inventors: Søren Qvist Vestesen, Hellerup (DK); Thomas Qvist Vestesen, Copenhagen K (DK)

(73) Assignee: Vestesen Hybrid Energy ApS, Hellerup (DK)

( * ) Notice: Subject to any disclaimer, the term of this patent is extended or adjusted under 35 U.S.C. 154(b) by 0 days.

(21) Appl. No.: 18/273,901

(22) PCT Filed: Jan. 28, 2022

(86) PCT No.: PCT/DK2022/050015
§ 371 (c)(1),
(2) Date: Jul. 24, 2023

(87) PCT Pub. No.: WO2022/167049
PCT Pub. Date: Aug. 11, 2022

(65) Prior Publication Data
US 2024/0396337 A1    Nov. 28, 2024

(30) Foreign Application Priority Data

Feb. 2, 2021 (DK) .............................. PA202170048

(51) Int. Cl.
*H02J 3/24* (2006.01)
*H02J 3/18* (2006.01)
(Continued)

(52) U.S. Cl.
CPC ............... *H02J 3/241* (2020.01); *H02J 3/18* (2013.01); *H02J 3/30* (2013.01); *H02J 3/32* (2013.01);
(Continued)

(58) Field of Classification Search
CPC ........ H02J 3/18; H02J 3/30; H02J 3/32; H02J 3/241; H02J 3/381; H02J 2300/10; H02J 2300/28; H02J 2300/40; H02J 2203/10
(Continued)

(56) References Cited

U.S. PATENT DOCUMENTS 10,135,251 B2    11/2018  Berard
10,840,708 B2 *  11/2020  Dobrowolski ......... G05B 17/02
(Continued)

FOREIGN PATENT DOCUMENTS

EP          3487027 A1     5/2019
WO       2019180096 A1     9/2019
WO       2020154326 A1     7/2020

OTHER PUBLICATIONS

Nordic Patent Institute, International Search Report, International Application No. PCT/DK2022/050015, Mailed Mar. 4, 2022, 2 pages.
(Continued)

*Primary Examiner* — Hal Kaplan
(74) *Attorney, Agent, or Firm* — Nordic Patent Service

(57) ABSTRACT

A power supply system and method for operating an electrical grid having coupled thereto at least one fluctuating source of AC power generated from renewable energy, consumers creating a fluctuating AC power demand, at least one grid forming controllable inverter coupled to an electric battery, and the power supply system including a controller. The controller being configured to perform a method of:
  operating the at least one fluctuating source of AC power as a slave to the grid, measuring grid frequency,
  controlling grid frequency with the controllable inverter as master controller to obtain a desired grid frequency,
  supplying power from the electric battery through the controllable inverter to the grid when the measured grid
(Continued)

frequency is below the desired grid frequency by more than a first lower margin, and withdrawing power through the controllable inverter from the grid to the electric battery when the measured grid frequency is above the desired grid frequency by more than a second first upper margin.

19 Claims, 4 Drawing Sheets

(51) Int. Cl.
    *H02J 3/30*     (2006.01)
    *H02J 3/32*     (2006.01)
    *H02J 3/38*     (2006.01)

(52) U.S. Cl.
    CPC ........... *H02J 3/381* (2013.01); *H02J 2203/10* (2020.01); *H02J 2300/10* (2020.01); *H02J 2300/28* (2020.01); *H02J 2300/40* (2020.01)

(58) Field of Classification Search
    USPC .......................................................... 307/102
    See application file for complete search history.

(56) References Cited

U.S. PATENT DOCUMENTS

| | | | |
|---|---|---|---|
| 11,621,560 B2 * | 4/2023 | Vestesen | H02J 3/32 307/38 |
| 2016/0329713 A1 | 11/2016 | Berard et al. | |
| 2017/0104343 A1 | 4/2017 | Elbsat et al. | |

OTHER PUBLICATIONS

European Patent Office, Extended European Search Report, Application No. 22749291.5, Mailed Dec. 16, 2024, 8 pages.

* cited by examiner

METHOD AND SYSTEM FOR OPERATING AN ELECTRICAL GRID

TECHNICAL FIELD

The disclosure relates to, a method and system for operating an electrical grid, in particular a method and system for operating an isolated electrical grid in which most or all of the energy is generated by fluctuating renewable energy sources, for example, wind energy, solar energy, hydro energy and/or wave energy.

BACKGROUND

Isolated grids require a grid forming component that ensures stable voltage and frequency under all foreseeable operating scenarios. Conventionally, this function has largely been the responsibility of alternators driven by a prime mover such as an internal combustion engine, the internal combustion engine being powered by a carbon-based fuel. Due to the desire to phase out non-renewable energy sources, there is a desire for grids to be operated at least for a substantial amount of the operating time without a combustion engine driven alternator.

Thus, there is a need for a method and system for operating a grid that does not rely for a substantial part on grid forming by combustion engine driven alternators.

WO2019180096 discloses a method and plant of operating a grid forming power supply plant based on both a renewable energy, and a carbon based energy, such as carbon based fuel, the grid forming power supply system comprising: a power input connection from an renewable power supply system, a power input connection from an carbon fuel engine based generator set, the generator set comprising: —the engine for converting the carbon-based energy into motion energy, preferably equipped for low loading and fast response as disclosed in EP0745186, a generator, such as an alternator, for converting the motion energy into electrical energy, and a clutch for coupling and uncoupling of the engine with the generator, a power buffer, such as comprising a battery, subsystem for providing short term grid forming capacity, a plant grid forming controller for controlling grid parameters by means of controlling steps of a method according to one or more of the preceding claims, the plant grid forming controller comprising: interaction means for interacting with a control unit of the renewable power supply system, interaction means for interacting with a power buffer control unit, interaction means for interaction with a control unit of the generator set. However, this system still relies largely on the carbon fuel powered combustion engine that drives an alternator as a major component for ensuring stable voltage and frequency.

SUMMARY

The aspects of the disclosed embodiments provide a method and system for forming a grid, and ensuring stable voltage and frequency of an isolated grid, i.e. operating an electrical grid, which allows maximum penetration of renewable energy sources.

The foregoing and other aspects of the present disclosure are achieved by the features of the independent claims. Further implementation forms are apparent from the dependent claims, the description, and the figures.

According to a first aspect, there is provided a method for operating an isolated electrical grid, the grid having coupled thereto:

at least one fluctuating source of AC power generated from renewable energy, consumers creating a fluctuating AC power demand, at least one grid forming controllable inverter coupled to an electric battery, the method comprising:

operating the at least one fluctuating source of AC power as a slave to the grid, controlling grid frequency with the controllable inverter as master controller to obtain a desired grid frequency, measuring grid frequency, supplying power from the electric battery through the controllable inverter to the grid when the measured grid frequency is below the desired grid frequency by more than a first lower margin, and withdrawing power through the controllable inverter from the grid to the electric battery when the measured grid frequency is above the desired grid frequency by more than a first upper margin.

The control method, system infrastructure, and system configuration allow for a hybrid energy generating system in an isolated grid situation that adjusts with fast and robust response using each component within their most optimal operation area supported by their own dynamic in combination with total system dynamic.

By both:

operating the at least one fluctuating source of AC power as a slave to the grid and controlling grid frequency with the at least one grid forming controllable inverter as master controller to obtain a desired grid frequency, and supplying power from said electric battery through said grid forming controllable inverter to the grid when the measured grid frequency is below the desired grid frequency by more than a first lower margin, and withdrawing power through said grid forming controllable inverter from the grid to said electric battery when the measured grid frequency is above the desired grid frequency by more than a first upper margin is required, it becomes possible to react fast to deviations of the frequency using the at least one grid forming inverter as the master grid forming element of the grid and ensure a stable grid frequency.

The system allows for operating with maximum continuous renewable energy penetration.

In a possible implementation form of the first aspect, the controllable inverter allows grid frequency to vary within the first lower margin and the first upper margin.

In a possible implementation form of the first aspect, the method comprises increasing the amount of power supplied to the grid by the battery according to a defined slope, preferably substantially proportionally, with increasing deviation of the measured grid frequency below the first lower margin and vice versa, and increasing the amount of power withdrawn from the grid by the battery according to a defined slope, preferably proportionally with increasing deviation of the measured grid frequency above the first upper threshold and vice versa.

In a possible implementation form of the first aspect, the method comprises a controllable energy bank (resistive load-bank) coupled to the grid, the energy bank having a capacity to withdraw a variable amount of power from the grid, and the energy bank preferably having a capacity to change the amount of energy withdrawn from the grid faster than the battery can 10 change the amount of power withdrawn from the grid, and reducing power withdrawn from the grid by the energy bank when the measured grid frequency is below the desired grid frequency by more than a second lower margin, the second lower margin preferably being smaller than the first lower 15 margin, and increasing power withdrawn from the grid by the energy bank when the measured grid frequency is above the desired grid frequency by more than a second upper margin, the second upper margin preferably being smaller than the first upper margin, preferably comprising the energy bank allowing grid frequency to vary within the second lower and the second upper margin.

In a possible implementation form of the first aspect, the second lower margin is larger than the first lower margin, and the second upper margin is larger than the first upper margin.

In a possible implementation form of the first aspect, the energy bank engages before the grid forming inverter for assisting in adjusting the grid frequency.

In a possible implementation form of the first aspect, the method comprises increasing the amount of power withdrawn from the grid by the energy bank according to a defined slope, preferably proportionally, with increasing deviation of the grid frequency above the second upper threshold and vice versa, and decreasing the amount of power withdrawn from the grid by the energy bank according to a defined slope, preferably proportionally, with increasing deviation of the grid frequency below the second lower threshold and vice versa.

In a possible implementation form of the first aspect, the grid has selectively coupled thereto, in parallel with the controllable inverter, at least one driven or non-driven alternator for stabilizing grid frequency fluctuations, for adding inertia, and for improving grid voltage stability, comprising controlling reactive power, inertia and/or short-circuit effect in the grid by selectively coupling and decoupling the at least one or more selectively driven or non-driven alternators to the grid in parallel with the controllable inverter, the selectively driven alternators preferably being driven by an internal combustion engine, the alternator preferably being operably coupled to a flywheel to increase inertia.

In a possible implementation form of the first aspect, the method comprises measuring reactive power drawn from the controllable inverter, and coupling at least driven or non-driven alternator to the grid in parallel with the controllable inverter when reactive power drawn the controllable inverter exceeds a first reactive power threshold, preferably coupling one or more additional driven or non-driven alternator to the grid in parallel with the controllable inverter when reactive power drawn from the controllable inverter remains above the first reactive power threshold.

In a possible implementation form of the first aspect, the method comprises keeping alternators online connected to the busbar for stabilizing the grid even though the internal combustion engines are disengaged from the alternators by a clutch system and stopped.

In a possible implementation form of the first aspect, the method comprises coupling one or more additional driven or non-driven alternators to the grid in parallel with the controllable inverter when wind turbines or other electric drives coupled to the grid are started up, preferably upon detection or notification of the turbines or other electric drives starting up.

In a possible implementation form of the first aspect, the method comprises measuring active power and reactive power, minimizing active power drawn from the controllable inverter, and covering reactive power with the at least one driven or non-driven alternator when reactive power is above a reactive power threshold, and preferably covering reactive power with the at least one fluctuating source of AC power when reactive power is below a predetermined threshold.

In a possible implementation form of the first aspect, the grid has selectively coupled thereto, in parallel with the controllable inverter, at least one alternator driven by an internal combustion engine, the method comprising start increasing engine power production according to a defined slope when the measured grid frequency is below the desired grid frequency by more than a third lower margin, the third lower margin being smaller than the second lower margin, and decreasing engine power according to a defined slope when the measured grid frequency exceeds the desired grid frequency by more than a third upper margin, the third upper margin being smaller than the second upper margin, preferably comprising the driven alternator allowing grid frequency to vary within the third lower and the third upper margin.

In a possible implementation form of the first aspect, the method comprises controlling a battery charge level within a nominated control band, comprising for a grid having the energy bank coupled thereto, increasing power withdrawn from the grid by the energy bank when the battery charge level reaches the upper limit of the control band and/or for a grid having the generator driven by an internal combustion engine coupled thereto, starting and/or increasing engine power when the battery charge level reaches a lower limit of the control band.

In a possible implementation form of the first aspect, the method comprises charging the battery by withdrawing energy from the grid when surplus power is available from the fluctuating source of AC power.

In a possible implementation form of the first aspect, the method comprises controlling grid voltage with the controllable inverter as master controller to obtain a desired grid voltage.

In a possible implementation form of the first aspect, the grid is an isolated grid.

In a possible implementation form of the first aspect, the renewable energy generation systems are slaves to the controllable inverter and follow control signals from a charge level band in the battery coupled to the controllable inverter.

In a possible implementation form of the first aspect, the grid-forming inverter battery is able to take total load on the consumer side with the battery having sufficient fast capability for the energy balancing functionality of the battery inverter system.

In a possible implementation form of the first aspect, the energy bank is frequency controlled.

In a possible implementation form of the first aspect, a continuous load on the energy bank is used for heating purposes.

In a possible implementation form of the first aspect, an additional storage solution is provided, and the surplus energy is the capturing into the additional storage solution instead of reducing power output of the one or more fluctuating sources of AC power from renewable energy.

In a possible implementation form of the first aspect, the additional storage feeds storage energy back into the system via the control grid-forming battery inverter system or by its own electrical energy generation system.

In a possible implementation form of the first aspect, the battery system is charged by surplus renewable energy.

In a possible implementation form of the first aspect, the grid frequency is measured with a high number of impulses per second, for example, more than 2250 impulses per second, preferably more than 4500 impulses per second, allowing a fast reading of the frequency trend variations, hence allowing for fast adjustments of the frequency by the controllable inverter.

In a possible implementation form of the first aspect, the voltage at the busbar is sensed and compared with the desired reference value, and the voltage difference between them is sent to the proportional plus integral controller.

In a possible implementation form of the first aspect, a sine wave having amplitude 1 and reference frequency is multiplied to generate a reference signal, and this reference signal produces pulse width modulated pulses to switch on/off a voltage source inverter.

According to a second aspect, there is provided a controller for operating an electrical grid, the grid having coupled thereto:
at least one fluctuating source of AC power generated from renewable energy, consumers creating a fluctuating AC power demand,
a controllable grid forming inverter coupled to an electric battery,
the controller being configured to:
  operate the at least one fluctuating source of AC power as a slave to the grid,
  control grid frequency with the controllable grid forming inverter as master controller to obtain a desired grid frequency,
  measure grid frequency,
  supply power from the electric through the controllable grid forming inverter to the grid when the measured grid frequency is below the desired grid frequency by more than a first lower margin, and
  withdraw power through the controllable grid forming inverter from the grid to the electric battery when the measured grid frequency is above the desired grid frequency by more than a first upper margin.

According to a third aspect, there is provided an energy supply system for operating a grid coupled to at least one fluctuating source of AC power generated from renewable energy and to consumers creating a fluctuating AC power demand, the system comprising a controllable inverter coupled to an electric battery configured to be coupled to the grid and a controller configured to:
operate the at least one fluctuating source of AC power as a slave to the grid,
a controller configured to:
  measure grid frequency,
  control grid frequency with the controllable inverter as master controller to obtain a desired grid frequency,
  supply power from the electric battery through the controllable inverter to the grid when the measured grid frequency is below the desired grid frequency by more than a first lower margin, and
  withdraw power through the controllable inverter from the grid to the electric battery when the measured grid frequency is above the desired grid frequency by more than a first upper margin.

According to a fourth aspect, there is provided a method for operating an electrical grid, the grid having coupled thereto:
at least one fluctuating source of AC power generated from renewable energy,
consumers creating a fluctuating AC power demand,
at least one grid forming controllable inverter coupled to an electric battery,
the method comprising:
  operating the at least one fluctuating source of AC power as a slave to the grid up to a controlled maximum power level, measuring grid frequency,
  controlling grid frequency with the controllable inverter as master controller to obtain a desired grid frequency, monitoring charge level of the battery, and
  reducing the controlled maximum power level when the charge level of the battery exceeds an upper battery charge level threshold.

According to a possible implementation form of the fourth aspect, the at least one fluctuating source of AC power comprises a photovoltaic based source of AC power and a wind turbine based source of AC power, comprising reducing power from the photovoltaic source of AC power before reducing power from the wind turbine based source of AC power when reducing the maximum power level and vice versa.

According to a possible implementation form of the fourth aspect, an energy bank is connected to the grid, comprising increasing power absorbed by the energy bank when the battery charge level exceeds the battery charge level threshold.

According to a possible implementation form of the fourth aspect, the method comprises activating a motor and/or engine driven alternator coupled to the grid by starting a motor or engine coupled to an alternator or by coupling a running motor or engine to an alternator coupled to the grid when the battery charge level is below a lower battery charge level threshold.

According to a fifth aspect, there is provided energy supply system for operating a grid coupled having coupled thereto:
at least one fluctuating source of AC power generated from renewable energy,
consumers creating a fluctuating AC power demand, at least one grid forming controllable inverter coupled to an electric battery,
the energy supply system comprising a controller configured to:
  operate the at least one fluctuating source of AC power as a slave to the grid up to a controlled maximum power level,
  measure grid frequency,
  control grid frequency with the controllable inverter as master controller to obtain a desired grid frequency,
  monitor charge level of the battery, and
  reduce the controlled maximum power level when the charge level of the battery exceeds an upper battery charge level threshold.

According to a sixth aspect, there is provided a method for operating an electrical grid, the grid having coupled thereto:
at least one fluctuating source of AC power generated from renewable energy,
consumers creating a fluctuating AC power demand,
at least one grid forming controllable inverter coupled to an electric battery,
a power bank capable of absorbing power from the grid at a variable and controllable level rate
the method comprising:
  operating the at least one fluctuating source of AC power as a slave to the grid up to a controlled maximum power level, measuring grid frequency, controlling grid frequency with the controllable inverter as master controller to obtain a desired grid frequency, monitoring temperature of the battery, and absorbing surplus power with the battery when the battery temperature is below a first battery temperature threshold, absorbing surplus power with the energy bank when the battery temperature is above a first battery temperature threshold and/or absorbing surplus power with the energy bank when an increase in surplus power accelerates above a level defined by a first surplus power acceleration threshold.

According to a possible implementation form of the sixth aspect, the method comprises reducing power from the at least one fluctuating source of AC power when the battery temperature is above the first threshold and/or when the energy bank is absorbing energy at a level above a first energy bank absorption capacity level.

According to a seventh aspect, there is provided an energy supply system for operating a grid coupled having coupled thereto:

at least one fluctuating source of AC power generated from renewable energy, consumers creating a fluctuating AC power demand, at least one grid forming controllable inverter coupled to an electric battery, a power bank capable of absorbing power from the grid at a variable and controllable level rate the energy supply system comprising a controller configured to:

operate the at least one fluctuating source of AC power as a slave to the grid up to a controlled maximum power level, measure grid frequency, control grid frequency with the controllable inverter as master controller to obtain a desired grid frequency, monitor temperature of the battery, and absorbing surplus power with the battery when the battery temperature is below a first battery temperature threshold, absorb surplus power with the energy bank when the battery temperature is above a first battery temperature threshold and/or absorb surplus power with the energy bank when an increase in surplus power accelerates above a level defined by a first surplus power acceleration threshold.

These and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
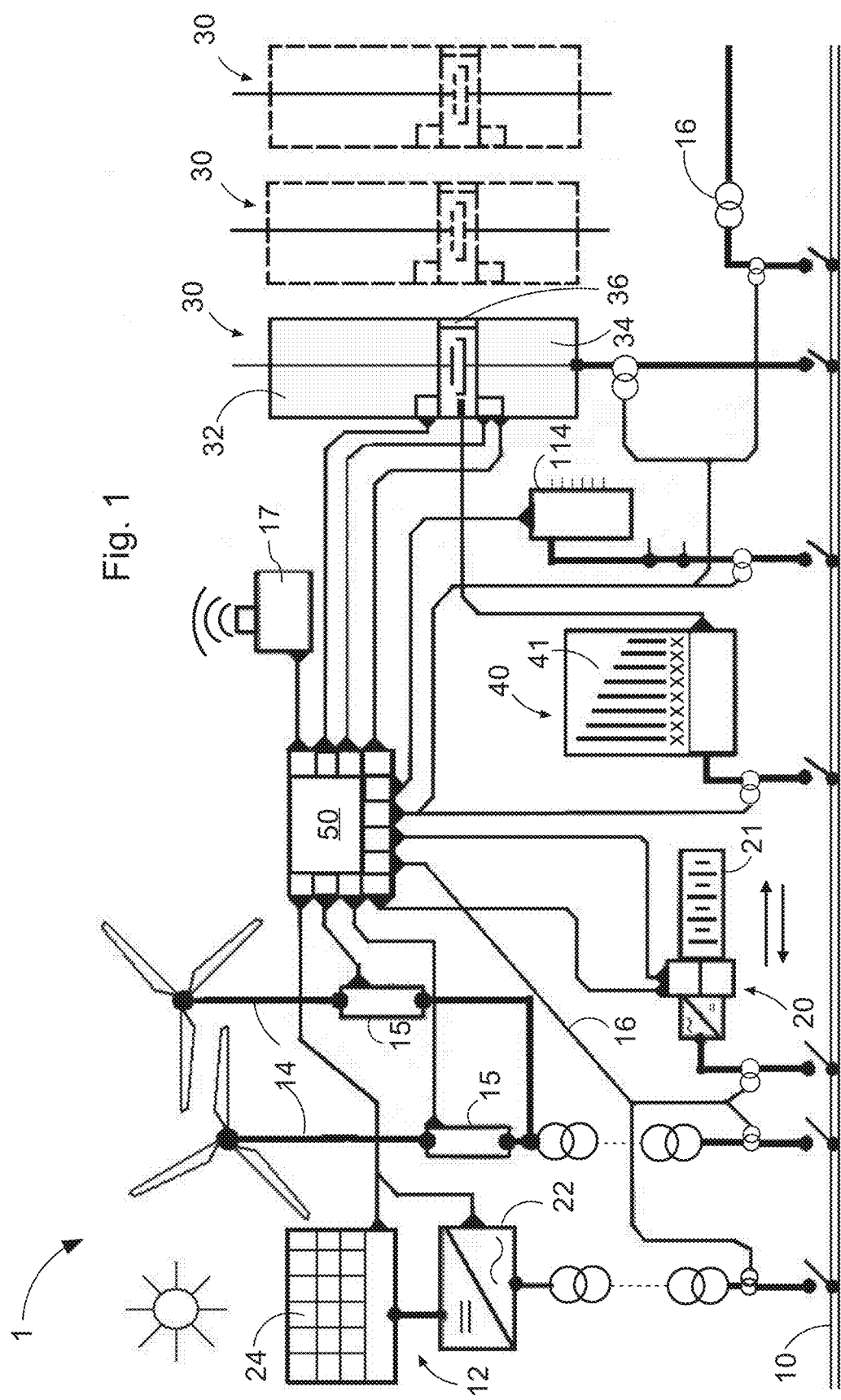
FIG. 1 is a diagrammatic overview of a system comprising an embodiment of an energy supply system.

FIG. 1 illustrates system 1 for supplying power to an isolated grid, comprising both required and optional elements. The power grid, preferably an isolated grid that preferably only is provided with electrical power from the power supply system 1, is connected to the power supply system 1 by a busbar 10. The grid connects to consumers, which create a fluctuating AC power demand on the grid.

A master controller 50, controls the operation of the power supply system 1. The power supply system 1 comprises one or more fluctuating sources of AC power generated from renewable energy. These fluctuating sources of AC power are in the shown embodiment in the form of a wind turbine 14 and a solar energy collector 12. However, it is understood that the fluctuating sources of AC power 12, 14 generated from renewable energy may include other forms of renewable energy e.g. wave energy, tidal energy, or hydro energy. The wind turbines 14 comprise a terminal box 15 each and are coupled to the busbar 10. The wind turbines 14 receives a control signal, e.g. via a signal line, from the master controller 50, and the master controller 50 receives information about the operation of the wind turbine 14. The solar energy collector 12 comprises one or more solar panels 24 and is coupled to an inverter 22 which is in turn coupled to the busbar 10. The inverter 22 receives a control signal from the master controller 50 and the master controller receives information about the operation of the solar energy collector 12 from the inverter 22, e.g. via a signal line.

At least one grid forming controllable inverter 20 is coupled to a rechargeable electric battery 21, so that the controllable inverter 20 can, depending on need, receive electric power from the battery 21 and store electric power in the battery 21. Several grid forming controllable inverters 20 can be arranged in parallel to obtain the required capacity and/or redundancy. The battery 21 can be of any suitable type comprising secondary cells, with a suitable capacity to store electrical charge and a sufficiently high C-rate. In an embodiment, the battery 21 is assisted by power from the fuel cell for the supply of electric power to the controllable inverter 20. Several batteries 21 can be arranged in parallel to obtain the required capacity and/or redundancy.

The grid forming controllable inverter 20 is coupled to the master controller 50, e.g. via a signal line, and the operation of the grid forming controllable inverter 20 is controlled by the master controller 50. In an embodiment, the master controller 50 is an integral part of the grid forming controllable inverter 20.

Figure 4:
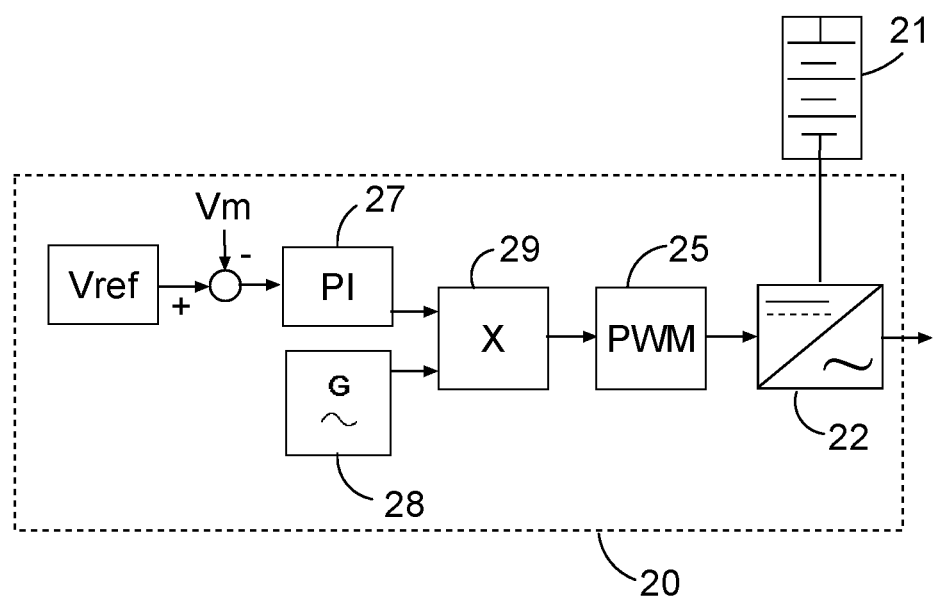
FIG. 4 is a diagrammatic illustration of a controllable inverter that is used in the system of FIG. 1

The grid forming inverter control structure incorporates a voltage regulator and its frequency is auto-generated. The controllable inverter 20 is grid forming, i.e. it is responsible for producing and maintaining voltage and frequency at the busbar 10. Thus, the controllable inverter 20 ensures that the grid operates with a required voltage (Vref) and frequency (e.g. 230 V and 50 Hz or 110 V and 60 Hz) and this is in part achieved by the inverter control. The diagram of the inverter control scheme is shown in FIG. 4. The voltage at the busbar 10 is sensed (Vm) and compared with the desired reference value (Vref) and the difference between them is sent to proportional plus integral (PI) controller 27. A sine wave having amplitude 1 and frequency 50 Hz (or other desired value) from a sine wave generator 28 is multiplied in a multiplier 29 to generate the reference signal. This reference signal is sent to a pulse width modulator 25 to produce pulse width modulated (PWM) pulses to switch on/off a voltage source inverter 20. An LC filter (not shown) is arranged in the controllable inverter 20 in order to eliminate the high frequency harmonics from output AC voltage.

A controllable energy bank (resistive load-bank) 40 is coupled to the grid. The energy bank 40 is controlled by the master controller 50, e.g. via a signal line. The energy bank 40 has a capacity to withdraw a variable amount of power from the grid, and the energy bank 40 preferably has a capacity to change the amount of energy withdrawn from the grid faster than the battery 21 can change the amount of power withdrawn from the grid. The energy bank 40 is a system that is coupled to the grid via the busbar 10 to provide rapid changes of resistive load on the grid. The energy bank 40 provides fast regulation with load steps in a binary range. In an embodiment, the energy bank 40 is a resistive load bank or a group of resistive load banks that are individually or groupwise selectively coupled to and decoupled from the grid.

The energy bank 40 provides a very fast absorbing capacity of excess electrical power. In an embodiment the energy bank 40 comprises a number of resistors 41, preferably air cooled or water cooled or a combination thereof. The resistors 41 are arranged to directly absorb electrical energy from the grid and convert it into heat. In an embodiment, the energy bank 40 comprises electrolysis units (not shown) instead of or in addition to resistors 41 for energy bank 40.

The grid has selectively coupled thereto, in parallel with the controllable inverter 20, at least one selectively driven or non-driven alternator 34 for stabilizing grid frequency fluctuations by adding inertia and for improving grid voltage stability. Non-driven alternators are alternators that are rotating synchronously with the grid and are kept spinning by the grid and form a condenser. Non-driven alternators are not coupled to an engine, or can at least be disengaged from such engine. e.g. by a clutch, e.g. when the non driven alternator 34 is part of a hybrid generator set. In case the non-driven alternator 34 is not part of a hybrid generator set, the non-driven alternators 34 are typically connected to a motor, e.g. an electric drive motor, only for "soft" starting up of the non-driven alternator 34.

These alternators 34 are controlled by the master controller 50 e.g. via signal lines. The alternator 34 is in an embodiment driven by an internal combustion engine 32. This so-called hybrid genset solution 30 with a genset of the standard type equipped with clutch system 36 of standard type. Additional inertia mass may be added to the alternators, for example in the form of the flywheel (not shown), to increase the kinetic energy effect. The alternator 34 is connected to an internal combustion engine 32 on a common bedframe for engine power backup function. When alternator 34 is online (rotating in sync with the grid), engine start-up is fast as the internal combustion engine 32 only starts up itself and does not have to accelerate the alternator rotor from 0 rpm to synchronous rpm as alternator 34 is already connected and online. Engine clutch-in is performed at synchronous rpm between alternator 34 and internal combustion engine 32. The alternator 34 may be equipped with an air duct system for ventilation air for connecting to nominated engine filter housing as described in EP0745186. The internal combustion engines 32 may be hybrid equipped for optimal operation in lower loads and for having fast response which may include the engine cooler system separated from the internal combustion engine as described in EP0745186.

A supervisory control and data acquisition system (SCADA) 17 is coupled to the master controller 50, e.g. via a signal line, for supervisory management and is connected to a large area network, e.g. the Internet via a wireless or wired connection.

An AUX supply 114 provides power for the master controller 50 and other auxiliary equipment including measurement equipment.

Grid supply 16 connects the busbar 10 to the grid.

Figure 2:
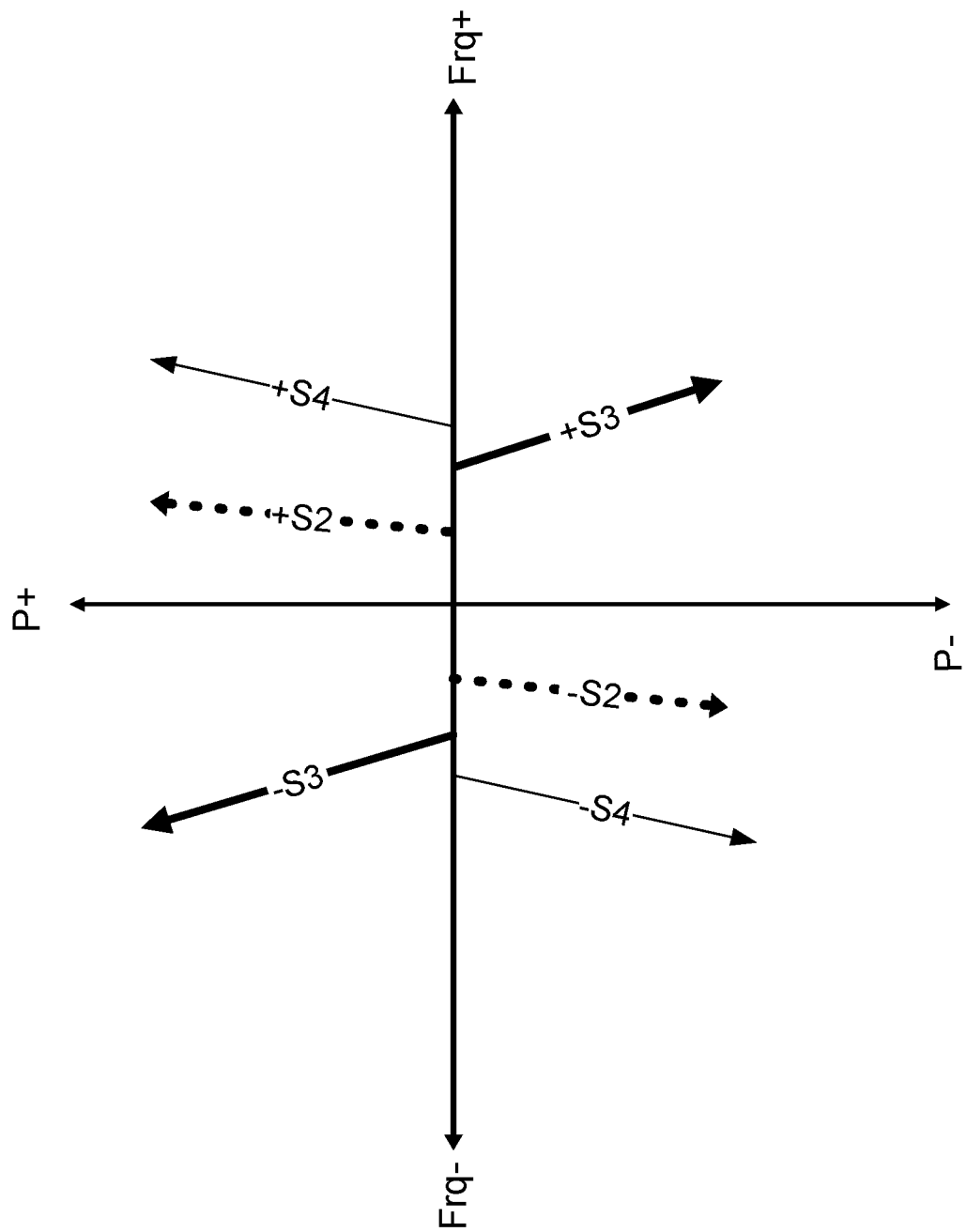
FIG. 2 is a graph illustrating a first control principle.

FIG. 2 illustrates a first control principle that is implemented by the master controller 50. The master controller 50 is configured to operate the at least one fluctuating source of AC power 12, 14 as a slave to the grid, to measure grid frequency, to control grid frequency with the controllable inverter 20 as master controller to obtain a desired grid frequency, to supply power "+S3" from the electric battery 21 through the controllable inverter 20 to the grid when the measured grid frequency is below the desired grid frequency by more than a first lower margin, and to withdraw power "−S3" through the controllable inverter 20 from the grid to the electric battery 21 when the measured grid frequency is above the desired grid frequency by more than a second upper margin. The lower margin is at the root of the arrow +S3 and the upper margin is at the root of the arrow −S3. The controllable inverter 20 allows the grid frequency to vary within the first lower margin and the first upper margin.

The main control principle is controlling via frequency. This results in a high-power quality typically within approximately +/−0.4-0.8 Hz.

The grid frequency is measured with a high number of impulses per secs giving a fast reading of the frequency trend variations, hence allowing for fast adjustments.

The amount of power supplied to the grid by the battery is increased according to a defined slope in kW/sec illustrated by the orientation of arrow "+S3", substantially proportionally, with increasing deviation of the measured grid frequency below the first lower margin and vice versa. The amount of power withdrawn from the grid by the battery 21 is increased according to a defined slope in kW/sec illustrated by the orientation of the arrow "−S3", proportionally with increasing deviation of the measured grid frequency above the first upper margin and vice versa.

Power is in an embodiment withdrawn under control from the master controller 50 from the grid by the energy bank 40 when the measured grid frequency is below the desired grid frequency by more than a second lower margin, the second lower margin being smaller than the first lower margin, and power withdrawn from the grid under control of the master controller 50 by the energy bank 40 is increased when the measured grid frequency is above the desired grid frequency by more than a second upper margin, the second upper margin being smaller than the first upper margin, Thus, the energy bank allows grid frequency to vary within the second lower and the second upper margin.

The amount of power withdrawn from the grid by the energy bank 40 is in an embodiment increased according to a defined slope in kW/sec illustrated by the orientation of the arrow "+S2", proportionally, with increasing deviation of the grid frequency above the second upper threshold and vice versa. The amount of power withdrawn by the grid from the energy bank 40 is decreased according to a defined slope in kW/sec illustrated by the arrow "−S2", proportionally, with increasing deviation of the grid frequency below the second lower threshold and vice versa.

Reactive power, inertia, and/or short-circuit effect in the grid are in an embodiment controlled by the master controller 50 selectively coupling and decoupling the at least one or more selectively driven or non-driven alternators 34 to the grid in parallel with the controllable inverter 20. The alternators 34 act as condensers and the alternators 34 can be replaced or supplemented by other forms of condensers.

Reactive power drawn from the controllable inverter 20 is in an embodiment measured, and at least one driven or non-driven alternator 34 is coupled by the master controller 50 to the grid in parallel with the controllable inverter 201 when reactive power drawn from the controllable inverter 20 exceeds a first reactive power threshold, preferably coupling one or more additional driven or non-driven alternators 34 to the grid in parallel with the controllable inverter 20 when reactive power drawn from the controllable inverter 20 remains above the first reactive power threshold.

One or more additional driven or non-driven alternators 34 are in an embodiment coupled to the grid by the master controller 50 in parallel with the controllable inverter 20 when wind turbines 14 or other electric drives coupled to the grid are started up, preferably upon detection or notification of the wind turbines 14 or other electric drives starting up.

According to an embodiment the master controller 50 receives measurements of active power and reactive power, and the master controller 50 is configured to minimize active power drawn from the controllable inverter and covering reactive power with the at least one driven or non-driven alternator 34 when reactive power is above a reactive power threshold. Reactive power is covered with the at least one fluctuating source of AC power when reactive power is below a predetermined threshold.

Figure 3:
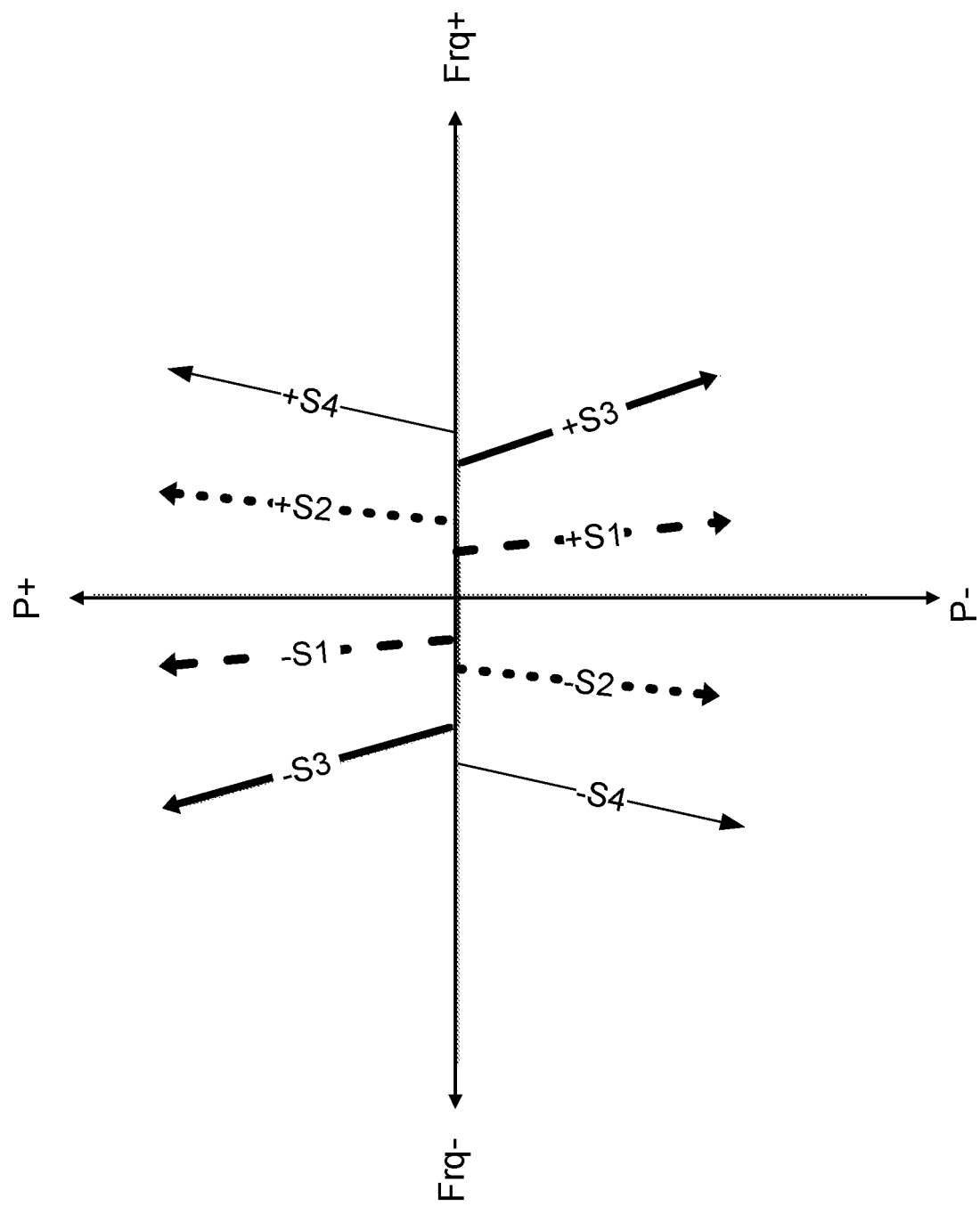
FIG. 3 is a graph illustrating a second control principle.

According to the second control principle illustrated in FIG. 3, which is combined with the first control principle, the master controller 50 is configured to start increasing power production through one or more internal combustion engine driven alternators 34 according to a defined slope in kW/sec shown by the orientation of the arrow "−S1" when the measured grid frequency is below the desired grid frequency by more than a third lower margin, the third lower margin being smaller than the second lower margin. The root of the arrow "−S1" corresponds to the third lower margin. The master controller 50 is configured to start reducing power production through one or more internal combustion engine driven alternators 34 when the measured grid frequency exceeds the desired grid frequency by more than a third upper margin according to a defined slope in kW/sec shown by the orientation of the arrow "+S1". The third upper margin is smaller than the second upper margin and corresponds to the root of the arrow "+S1". The master controller 50 allows the operation of the internal combustion engine driven alternators 34 and effected the grid frequency varies within the third lower and the third upper margin.

In an embodiment, the master controller 50 is configured to control the battery charge level of the battery 21 within a nominated control band, by increasing power withdrawn from the grid by the energy bank 40 when the battery charge level reaches the upper limit of the control band and/or for a grid having the alternator 34 driven by an internal combustion engine coupled thereto, starting and/or increasing engine power when the battery charge level reaches a lower limit of the control band.

In an embodiment, the master controller 50 is configured to charge the battery 21 by withdrawing energy from the grid when surplus power is available from the fluctuating source of AC power 12,14.

In an embodiment, control principle 1 is active in parallel with control principle 2.

The energy balancing function is in an embodiment based on the grid-forming battery inverter 20 operating in frequency control mode in parallel with controlling the alternators 34. In an embodiment where the alternators are coupled to an internal combustion engine 32 via clutch 36, the internal combustion engine 32 is clutched out and stopped when 100% or more renewable energy is available for the grid. In this scenario, the alternator 34 continues online drawn by the renewable energy or the energy from the battery 21. In an embodiment, energy bank control is used to assist to dampen fast and/or large energy fluctuations. In an embodiment, the energy bank 40 is frequency controlled. The master controller 50 is configured to charge the battery 21 by surplus renewable energy and not from energy from an internal combustion engine 32.

When there is more than a hundred percent renewable energy available to the grid, the master controller 50 is configured to operate according to dynamic control principle 1. 100% and more renewable energy surplus is a situation where there is more renewable energy available than consumption on the consumer side. In this scenario, the master controller 50 is configured to clutch out and stop the internal combustion engines 32 while the alternators 34 continue online rotating in parallel with the controllable battery inverter 20. The master controller 50 is configured to increase and decrease the amount of power consumed by the energy bank 40 to dampen energy fluctuations caused e.g. by the fluctuating sources of renewable energy and/or fluctuations in consumer demand.

In this scenario, the controllable inverter 20 operates in frequency control mode and controls the frequency within a deadband between the +S3 Hz to −S3 Hz frequency setpoints. The renewable energy sources 12, 14 are controlled by the master controller 50 in response to battery charge level of the battery 21 within a nominated kW band in battery +S4 kWh to −S4 kWh. The master controller is in an embodiment configured to activate the energy bank 40 within deadband +S2 Hz to −S2 Hz frequency setpoints depending on the need for damping energy fluctuations. The deadband +S2 Hz to −S2 of the energy bank 40 can, as shown, be chosen to be within the deadband +S3 to −S3 of the controllable inverter 20, for reducing wear and tear on the battery 21 and also to dampen large power variations on the grid.

However, the deadband +S2 Hz to −S2 of the energy bank 40 can be chosen or adjusted to be outside the deadband +S3 to −S3 of the controllable inverter 20, in particular, to assist to dampen large power variations on the grid.

When less than 100% renewable energy is available the master controller 50 is configured to operate according to this second control principle. Less than 100% renewable energy is the situation where the grid demand is larger than the power available either directly from wind and/or PV and/or from stored in the battery 21. Internal combustion engines 32 are in operation and coupled to the alternators 34 operating with controlling the voltage and frequency of the grid in parallel with the controllable inverter 20. The master controller 50 is configured to control the generator sets (genset) 30 within the deadband +S1 Hz to −S1 Hz frequency setpoints, to control the controllable inverter 20 within the deadband +S3 Hz to −S3 Hz setpoints, and to optionally control the activation of the energy bank 40 within the deadband +S2 Hz to −S2 Hz frequency setpoints, depending also on the need for damping energy fluctuations.

When the grid frequency increases, e.g. due to increasing renewable energy and/or decreasing consumption the master controller 50 is configured to:

decrease energy production from the combustion engine driven alternators 34 (gensets 30) at +S1 Hz, increase power consumption by the energy bank 40 at +S2 Hz, and to increase battery charge at +S3 Hz.

If the last genset 30 cannot operate down to zero load, the master controller 50 will load energy bank 40 with a load similar to the least genset minimum load, where after the internal combustion engine 34 is clutched out and stopped (preferably after a period of time (delay) in which the grid has been stable for a nominated period). Alternatively, the master controller 50 may charge increased charging of the battery 21. Battery charging may be increased until this charging level is similar to minimum load on genset 30 before internal combustion engine 32 is clutched out and stopped, preferably after a period of time (delay) in which the grid has been stable for a nominated period.

The active energy bank controlling 40 is optional. Activation of the energy bank 40 depends on fluctuations or risk of periods with large fluctuations or depending on the condition of the battery 21. In a scenario where the grid frequency decreases, e.g. due to decreasing renewable energy and/or increasing consumption the master controller 50 is configured to:

increase production using the internal combustion engine 34 at −S1 Hz, and to increase production from the battery 21 at −S3 Hz.

In an embodiment in which there is no energy bank 40 or the energy bank 40 is non-active, its functionality above is eliminated in the main control method and system function without energy bank 40.

If the energy bank 40 is loaded it can increase and decrease load. If non-loaded, the energy bank 41 can only increase load.

In an embodiment, a continuous load on energy bank 40 is used for heating purposes.

The additional storage solution is in an embodiment integrated into the above control logic and instead of reducing PV and wind, the surplus energy is the capturing into the storage solution. Additional storage may feed storage energy back into the system via the nominated grid-forming battery inverter system or by its own electrical energy generation system depending on the type of technology.

A battery 21 charge level band is nominated, where battery charge level is kept for having both capacity available for energy production to cover load 100% and energy charging to absorb surplus energy 100% to balance the load variations. The master controller 50 uses the charge level band in the battery 21 for control of the renewable energy production by continuously providing a maximum power reference. The charge level band is defined based on a kW-charge level band operation area in the battery 21 where there is the least wear and tear on the battery. The renewable energy sources 12, 14. e.g. wind, solar are slaves and operate within (and up to) a controlled maximum power output limit.

In an embodiment the master controller 50 is configured to: operate the at least one fluctuating source of AC power 12, 14 as a slave to the grid up to a controlled maximum power output limit, to measure grid frequency, to control grid frequency with the controllable inverter 20 as master controller to obtain a desired grid frequency, to monitor the charge level of the battery 21, and to reduce the controlled maximum power output limit when the charge level of the battery 21 exceeds an upper battery charge level threshold.

In an embodiment where the fluctuating source of AC power comprises a solar panel 12 and a wind turbine 14, the master controller 50 is configured to reduce power from the solar panel 12 before reducing power from the wind turbine 14 when reducing the maximum power level and vice versa. In an embodiment, the master controller 50 is configured to increase power absorbed by the energy bank 40 when the battery charge level exceeds the battery charge level threshold.

In an embodiment, the master controller 50 is configured to activate a motor and/or engine driven alternator 34 coupled to the grid by starting the motor or engine by coupling a running motor or engine to the alternator 34 when the battery charge level is below a lower battery charge level threshold.

In an embodiment the master controller 50 is configured to operate the at least one fluctuating source of AC power 12, 14 as a slave to the grid up to a controlled maximum power output limit, to measure grid frequency, to control grid frequency with the controllable inverter 20 as master controller to obtain the desired grid frequency, to monitor the temperature of the battery 21, and to absorb surplus power with the battery 21 when the battery temperature is below a first battery temperature threshold, to absorb surplus power with the energy bank 40 when the battery temperature is above a first battery temperature threshold and/or absorb surplus power with the energy bank 40 when an increase in surplus power accelerates above a level defined by a first surplus power acceleration threshold. The master controller 50 can in this embodiment further be configured to reduce power from the at least one fluctuating source of AC power 12, 14 when the battery temperature is above the first threshold and/or when the energy bank 40 is absorbing energy at a level above a first energy bank absorption capacity level.

The controllable inverter 20 is controlled to only cover active power. The reactive power and voltage are covered by the online alternators 34.

When power from the alternators 34 approaches 0 kVar, wind turbine 14 and/or solar inverters 22 will be ordered to absorb a small amount of reactive power.

The number of alternators 34 of the total alternator fleet remaining online is determined by, but not limited to, below requirements that are constantly calculated:

1. Reactive power requirements
2. Short circuit effect requirements
3. System electrical stability requirements incl. stability in inverter systems For system electrical stability, the master controller 50 makes active use of the mechanical inertia (kinetic energy) and electrical cadence of the online alternator fleet. If no genset 30 with clutch 36 is available, then a separate condenser system (not shown) can take over the role of disengaged online alternator capacity with a similar operation strategy. Additional condenser capacity is be added if there is too little available alternator capacity in the system.

At a first nominated setpoint for reactive power in the total energy system, the master controller 50 commands the photovoltaic unit 12 and/or wind turbines 14 to assist in reactive power production. Preferably, the wind turbines 14 are started before the photovoltaic unit 12.

At a second nominated setpoint for reactive power in the total energy system, the master controller commands the controllable inverter 20 to assist in reactive power production.

The master controller is configured to monitor temperatures and cell voltage of the battery 21.

If battery 21 reaches temperature max setpoint power from the photovoltaic sources 12 is reduced before reducing power from the wind turbines until a minimum charge level in the nominated control band of the battery 21 is reached.

When the battery reaches a high temperature threshold, the master controller 50 controls the energy bank 40 within deadband +S2 Hz to −S2 Hz. The master controller 50 also activates the energy bank 40 to dampen energy fluctuations in battery 21.

To protect the battery 21 master controller applies the following strategies:

1. The controllable inverter 20 is set to allow increase in frequency at large power increases. For this strategy, the energy bank 40 will have an activation set point after +S3 Hz and will here start to assist to dampen the large power increase.
2. The energy bank increases load based on charge level in battery 21 increasing above upper charge level setpoint in control band in battery +S4 kWh at the same time as power from the wind turbines 14 wind and/or solar panels 12 is reduced.
3. The energy bank 41 is commanded to put in load as per ramp based on increase in power into battery 21 when a fast increase in power to the battery 21 or an increase in frequency is identified.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single controller or other unit may fulfill the functions of several items recited in the claims. The mere fact that certain measures are recited in mutually different dependent a claims does not indicate that combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure.

The invention claimed is:

1. A method for operating an isolated electrical grid, said grid having coupled thereto:
    at least one fluctuating source of AC power generated from renewable energy,
    consumers creating a fluctuating AC power demand,
    at least one grid forming controllable inverter coupled to an electric battery, said method comprising:
    operating said at least one fluctuating source of AC power as a slave to said grid,
    controlling a grid frequency with said at least one grid forming controllable inverter as a master controller to obtain a desired grid frequency,
    measuring the grid frequency of said grid,
    supplying power from said electric battery through said at least one grid forming controllable inverter to the grid when the measured grid frequency is below the desired grid frequency by more than a first lower margin, and
    withdrawing power through said at least one grid forming controllable inverter from the grid to said electric battery when the measured grid frequency is above the desired grid frequency by more than a first upper margin; and wherein
    a controllable resistive load-bank is coupled to said grid, said resistive load-bank having a capacity to withdraw a variable amount of power from said grid, and said resistive load-bank having a capacity to change the amount of energy withdrawn from said grid faster than said battery can change the amount of power withdrawn from said grid, and wherein the method further includes
    reducing power withdrawn from said grid by the resistive load-bank when the measured grid frequency is below the desired grid frequency by more than a second lower margin, said second lower margin being smaller than said first lower margin, and increasing power withdrawn from said grid by the resistive load-bank when the measured grid frequency is above the desired grid frequency by more than a second upper margin.

2. The method according to claim 1, comprising said at least one grid forming controllable inverter allowing grid frequency to vary between said first lower margin and said first upper margin.

3. The method according to claim 1, comprising increasing the amount of power supplied to said grid by the battery according to a first defined slope, with increasing deviation of the measured grid frequency below said first lower margin and vice versa, and increasing the amount of power withdrawn from said grid by the battery according to a second defined slope, with increasing deviation of the measured grid frequency above said first upper margin.

4. The method according to claim 1, comprising:
    increasing the amount of power withdrawn from said grid by the resistive load-bank according to a defined slope, with increasing deviation of the grid frequency above said second upper margin and vice versa, and
    decreasing the amount of power withdrawn from the grid by the resistive load-bank according to a defined slope, with increasing deviation of the grid frequency below said second lower margin.

5. The method according to claim 1, wherein said grid has selectively coupled thereto, in parallel with said at least one grid forming controllable inverter, at least one selectively driven or non-driven alternator for stabilizing grid frequency fluctuations, for adding inertia, and for improving grid voltage stability, comprising controlling reactive power, inertia and/or short-circuit effect in said grid by selectively coupling and de-coupling said at least one or more selectively driven or non-driven alternators to said grid in parallel with said at least one grid forming controllable inverter.

6. The method according to claim 5, comprising measuring reactive power drawn from said at least one grid forming controllable inverter, and coupling at least one selectively driven or non-driven alternator to the grid in parallel with said at least one grid forming controllable inverter when reactive power drawn from said controllable inverter exceeds a first reactive power threshold.

7. The method according to claim 5, comprising coupling one or more additional selectively driven or non-driven alternators to said grid in parallel with said grid forming controllable inverter when wind turbines or other electric drives coupled to said grid are started up.

8. The method according to claim 5, comprising measuring active power and reactive power, minimizing active power drawn from the at least one grid forming controllable inverter, and covering reactive power with said at least one driven or non-driven alternator when reactive power is above a reactive power threshold.

9. The method according to claim 1, wherein said grid has selectively coupled thereto, in parallel with said at least one grid forming controllable inverter, at least one alternator driven by an internal combustion engine, said method comprising starting to increase engine power production according to a defined slope when the measured grid frequency is below the desired grid frequency by more than a third lower margin, said third lower margin being smaller than said second lower margin, and
    decreasing engine power according to a defined slope when the measured grid frequency exceeds the desired grid frequency by more than a third upper margin, said third upper margin being smaller than said second upper margin.

10. The method according to claim 1, comprising controlling a battery charge level within a nominated control band, for a grid having said resistive load-bank coupled thereto, increasing power withdrawn from said grid by the resistive load-bank when the battery charge level reaches the upper limit of said control band and/or for a grid having a generator driven by an internal combustion engine coupled thereto, starting and/or increasing engine power when said battery charge level reaches a lower limit of said control band.

11. The method according to claim 10, comprising charging the battery by withdrawing energy from said grid when surplus power is available from said fluctuating source of AC power.

12. The method according to claim 1, comprising controlling grid voltage with said at least one grid forming controllable inverter as master controller to obtain a desired grid voltage.

13. A controller for operating an electrical grid, said grid having coupled thereto:
at least one fluctuating source of AC power generated from renewable energy,
consumers creating a fluctuating AC power demand,
at least one grid forming controllable inverter coupled to an electric battery, said controller being configured to:
operate said at least one fluctuating source of AC power as a slave to said grid,
control a grid frequency with said controllable inverter as a master controller to obtain a desired grid frequency, measure the grid frequency,
supply power from said electric battery through said at least one grid forming controllable inverter to said grid when the measured grid frequency is below the desired grid frequency by more than a first lower margin, and
withdraw power through said at least one grid forming controllable inverter from said grid to said electric battery when the measured grid frequency is above the desired grid frequency by more than a first upper margin; and wherein
a controllable resistive load-bank is coupled to said grid, said resistive load-bank having a capacity to withdraw a variable amount of power from said grid, and said resistive load-bank having a capacity to change the amount of energy withdrawn from said grid faster than said battery can change the amount of power withdrawn from said grid, and wherein the controller is further configured to cause the resistive load bank to reduce power withdrawn from said grid when the measured grid frequency is below the desired grid frequency by more than a second lower margin, said second lower margin being smaller than said first lower margin, and increase power withdrawn from said grid by the resistive load-bank when the measured grid frequency is above the desired grid frequency by more than a second upper margin.

14. The controller according to claim 13, wherein the controller is further configured to cause the at least one grid forming controllable inverter to allow grid frequency to vary between said first lower margin and said first upper margin.

15. The controller according to claim 13, wherein the controller is further configured to increase the amount of power supplied to said grid by the battery according to a first defined slope, with increasing deviation of the measured grid frequency below said first lower margin and vice versa, and increasing the amount of power withdrawn from said grid by the battery according to a second defined slope, with increasing deviation of the measured grid frequency above said first upper margin.

16. An energy supply system for operating a grid coupled to at least one fluctuating source of AC power generated from renewable energy and to consumers creating a fluctuating AC power demand,
said system comprising a controllable inverter coupled to an electric battery configured to be coupled to said grid and a controller configured to:
operate said at least one fluctuating source of AC power as a slave to the grid, measure a grid frequency,
control the grid frequency with said controllable inverter as master controller to obtain a desired grid frequency,
supply power from said electric battery through said controllable inverter to the grid when the measured grid frequency is below the desired grid frequency by more than a first lower margin, and
withdraw power through said controllable inverter from the grid to said electric battery when the measured grid frequency is above the desired grid frequency by more than a second upper margin; and
the system further comprises a controllable resistive load-bank is coupled to said grid, said resistive load-bank having a capacity to withdraw a variable amount of power from said grid, and said resistive load-bank having a capacity to change the amount of energy withdrawn from said grid faster than said battery can change the amount of power withdrawn from said grid, and wherein the controller is configured to:
reduce power withdrawn from said grid by the resistive load-bank when the measured grid frequency is below the desired grid frequency by more than a second lower margin, said second lower margin being smaller than said first lower margin, and increase power withdrawn from said grid by the resistive load-bank when the measured grid frequency is above the desired grid frequency by more than a second upper margin.

17. The system according to claim 16, further comprising said at least one grid forming controllable inverter configured to allow the grid frequency to vary between said first lower margin and said first upper margin.

18. The system according to claim 16, wherein the controller is further configured to increase the amount of power supplied to said grid by the battery according to a first defined slope, with increasing deviation of the measured grid frequency below said first lower margin and vice versa, and increasing the amount of power withdrawn from said grid by the battery according to a second defined slope, with increasing deviation of the measured grid frequency above said first upper margin.

19. The system according to claim 16 further comprising a controllable resistive load-bank coupled to said grid, said resistive load-bank having a capacity to withdraw a variable amount of power from said grid, and said resistive load-bank having a capacity to change the amount of energy withdrawn from said grid faster than said battery can change the amount of power withdrawn from said grid, and wherein the controller is further configured to:
reduce power withdrawn from said grid by the resistive load-bank when the measured grid frequency is below the desired grid frequency by more than a second lower margin, and increase power withdrawn from said grid by the resistive load-bank when the measured grid frequency is above the desired grid frequency by more than a second upper margin.

\* \* \* \* \*